Patented Sept. 19, 1950

2,522,968

UNITED STATES PATENT OFFICE 2,522,968

HIGH-BOILING FLUOROCARBONS

Joseph H. Simons, State College, Pa., assignor to Minnesota Mining & Manufacturing Company, St. Paul, Minn., a corporation of Delaware No Drawing. Application November 28, 1947, Serial No. 788,651

2 Claims. (Cl. 260—648)

This application is a continuation-in-part of my copending application Ser. No. 529,182 (now Patent No. 2,456,027, issued December 14, 1948), filed on April 1, 1944, as a continuation-in-part of my application Ser. No. 237,157 (now abandoned), filed on October 26, 1938.

This application is also a continuation-in-part of my copending application Ser. No. 677,407, filed on June 17, 1946 (since abandoned in favor of Ser. No. 62,496, filed on Nov. 29, 1948), now Patent 2,519,983 which describes an electrochemical process useful for making high-boiling fluorocarbons and gives information concerning them.

This application relates to my discovery of a new class of synthetic carbon compounds having unique physical and chemical properties as compared to all previously known organic and inorganic compounds. These new substances are high-boiling saturated compounds consisting exclusively of carbon and fluorine atoms, and are termed saturated fluorocarbons (or carbon fluorides.) They have eight or more carbon atoms in the molecule, are liquid or solid at room temperature, and have boiling points above about 95° C. They have an extraordinarily high degree of chemical inertness and thermal stability, which is especially noteworthy in view of the large number of carbon atoms and the high molecular weights.

It had been previously stated in foreign literature publications of O. Ruff, R. Keim, and O. Bretschneider (Germany), and of P. Lebeau and A. Damiens (France), that direct fluorination of heated carbon would produce the gaseous fluorocarbon $CF_4$, together with small yields of $C_2F_6$ and $C_3F_8$, also gases. The compound $C_4F_{10}$ (which is also a gas) had been arbitrarily assumed to be present by Ruff, et al., for yield calculation purposes; but neither its existence, nor that of any higher fluorocarbon, had been established. Formation by this reaction of an explosive white solid material $(CF)_n$, an unsaturated fluorocarbon which readily decomposes to produce $CF_4$, was reported. Cyclic fluorocarbons had not been established as being obtainable by any method; although several foreign chemists had speculated in their writings as to the possible presence of cyclic 6-carbon fluorocarbons in complex mixtures obtained in their experiments.

My discovery of high-boiling fluorocarbon liquids containing compounds having eight or more carbon atoms in the molecule, which are highly inert and stable, and which have boiling points ranging upwards from about the boiling point of water, opened up entirely new fields of utility in the fluorocarbon field. The possibility of synthesizing such liquids was contra-indicated by the known fact that liquid polycarbon chlorides, bromides and iodides cannot exist. $C_3Cl_8$, a relatively unstable solid compound, was the highest known aliphatic carbon chloride. The previously mentioned work of others had not provided proof that liquid or solid saturated carbon fluorides can be made, or that such compounds, if they could exist, would be highly inert and stable. The only saturated fluorocarbons which had previously been reported as definitely made and identified by analysis and determination of properties, were the low-boiling gaseous compounds, $CF_4$ (b. p. $-128°$ C.) and $C_2F_6$ (b. p. $-78°$ C.). The prior workers never succeeded in substantiating their conjectures as to higher compounds so far as the literature shows.

My discovery resulted from an experiment in which mercury was unintentionally present in a copper reaction tube in which heated carbon was being reacted with fluorine gas. Unexpected results were obtained, different from those obtained when mercury was not present. I found that the mercury (converted to mercury fluoride by the fluorine), altered the reaction mechanism and resulted in the formation of hitherto unknown fluorocarbons having large numbers of carbon atoms in the molecule, at reaction chamber temperatures roughly between 200° and 600° C. This reaction mechanism seemingly does not produce the unsaturated explosive compound $(CF)_n$. The mercury fluoride serves as a catalyst but the effect is not to merely alter the formation rates of fluorocarbon compounds, but to bring about a different type of reaction mechanism which produces the higher saturated fluorocarbon compounds and in significant yields. Moreover, this type of reaction was found to produce cyclic fluorocarbons as well as open-chain fluorocarbons.

The fluorocarbon compounds to which this application particularly relates, having eight or more carbon atoms in the molecule, may be structurally classified in three sub-groups:

(A) Saturated acyclic compounds (open-chain aliphatic compounds) having the formula $$C_nF_{2n+2}$$

where $n$ is at least 8. The F:C atomic ratio is $2$ plus $2/n$.

(B) Saturated alicyclic compounds (cycloaliphatic compounds) having a carbocyclic ring which may or may not have one or more side groups; the formula being $C_nF_{2n}$, where $n$ is at least 8. The F:C atomic ratio is 2.

(C) Saturated polycyclic fused-ring compounds, which may or may not have one or more side groups. The F:C atomic ratio is less than 2.

My previously mentioned process produces a complex mixture of the above-mentioned types of fluorocarbons, including both liquid and solid compounds, having various numbers of carbon atoms, and including isomeric forms. The normally solid fluorocarbons are soluble in normally liquid fluorocarbons. The situation is comparable to the complex mixture of higher hydrocarbons found in petroleum. The complex mixture can be fractionated to produce liquid and solid fractions having limited boiling point ranges, consisting of mixtures of fluorocarbons, as distinguished from single pure compounds. However, it is possible to isolate relatively pure liquid and solid compounds from the reaction product mixture.

The uniqueness of these compounds, having eight or more carbon atoms in the molecule and boiling above about 95° C., is indicated by easily measured physical properties. Comparing them with all other previously known non-fluorocarbon compounds, inorganic as well as organic, on the basis of molecular weight, these new compounds have exceptionally low boiling points, low refractive indices, and low dielectric constants. The liquids have extremely low viscosities and surface tensions. The extremely limpid nature of the liquid fluorocarbons is illustrated by $C_8F_{18}$ (b. p. 102° C.) which has a kinematic viscosity of 0.73 centistokes at 18° C., although the molecular weight is 438. This value is only 69% as great as that of water at 18° C. That this sort of relationship is not a general characteristic of carbon halides is shown by the fact that all polycarbon chlorides, bromides and iodides are solids at room temperature.

These saturated fluorocarbons (both cyclic and non-cyclic) are colorless when liquid and are white or colorless when solid. They are odorless, non-toxic, non-corrosive, and have a high degree of chemical inertness. They do not react with strong acid or with strong alkali at ordinary temperatures. They do not hydrolyze with water. They do not burn or react with oxygen. They do not react with any of the metals at ordinary temperatures and react only with the more chemically active metals, such as sodium, at elevated temperatures. They can be heated to high temperatures in "Pyrex" laboratory type glassware without reacting or decomposing.

The fluorocarbons described herein, having eight or more carbon atoms in the molecule, and mixtures thereof, have utility for various purposes for which their unique physical and chemical properties lend particular fitness. Thus they may be employed to advantage as inert solvents, hydraulic mechanism liquids, heat transfer media, turbine impellants (for which the high vapor density relative to boiling point is an advantage), transformer liquids, dielectrics, and lubricants. They are useful as additives to other materials to confer upon the mixture some of the desirable properties of the fluorocarbons.

Since both the cyclic and non-cyclic saturated fluorocarbons have a high degree of chemical inertness and thermal stability, fractions consisting of mixtures thereof can be employed for many purposes with substantially the same results as would be obtained with pure cyclic or non-cyclic fractions. Although these fluorocarbons are highly inert, certain derivatives can be made. Thus it has been found that they react in vapor phase at high temperatures with hydrogen, chlorine and bromine, to produce saturated fluorocarbon hydrides, chlorides and bromides, as the result of hydrogenolysis, chlorinolysis and brominolysis, respectively. In such cases carbon-carbon bond cleavage is produced and in lieu thereof carbon-hydrogen, carbon-chlorine and carbon-bromine bonds are formed. These derivative compounds contain one or two hydrogen, chlorine or bromine atoms in the molecule, which provide points of attack for further chemical reactions to obtain still other fluorocarbon derivatives. The fact that the original fluorocarbon starting compounds contain eight or more carbon atoms makes possible liquid and solid derivative compounds containing a substantial number of carbon atoms which are bonded to fluorine atoms.

Illustrative specific fluorocarbon compounds, and fractions containing mixtures of fluorocarbons, will be described hereafter in connection with the Examples, mention being made of numerical values of certain physical properties.

*Example 1*

The reaction vessel was a copper tube approximately 25 inches long and 2 inches in diameter, provided with inlet and outlet connections. Finely divided "Norit" activated carbon, mixed with mercuric chloride crystals in the ratio of 1 gram to 50 of the carbon, was placed in the tube. A roll of mercury-amalgamated copper screening was placed in each end of the tube. The tube was heated to a temperature between 400° and 600° C. Fluorine gas was admitted to the inlet and reacted with the hot carbon. The mercury of the amalgamated screens, and of the mercury compound admixed with the carbon, was converted to mercury fluoride and in this form served as catalyst for the carbon fluorine reaction. The products from the outlet, in gaseous and vapor form, were led through a sodium hydroxide solution and into a gasometer where they were collected over water. Under the above conditions, it was found possible to collect about 1½ liters of reaction products per hour.

The reaction products were separated by condensation in a liquid air trap and subsequent fractional distillation. Fractions were taken at points where the temperature and the molecular weight determinations remained constant, the latter being made simultaneously with the fractionation process by means of a vapor density balance. Between certain of the compounds having constant boiling points, mixtures boiling at progressively increasing temperatures were obtained. Each fraction was refractionated in the same manner and then purified by passing through potassium hydroxide and phosphorous pentoxide. Air was removed by alternate vaporization, condensation and pumping.

In addition to gaseous fluorocarbons, having less than five carbon atoms in the molecule (including two open-chain $C_4F_{10}$ isomers boiling near 0° C.), there were obtained liquid and solid fluorocarbon products which were identified by analysis, molecular weight determinations, and chemical properties, as being non-olefinic saturated fluorocarbons, both cyclic and non-cyclic, having five or more carbon atoms in the molecule and boiling above 20° C. Alicyclic compound fractions having the formulas $C_5F_{10}$, $C_6F_{12}$ and $C_7F_{14}$, were each isolated in relatively pure form, and were identified by analysis and molecular weight determination. Liquid fractions intermediate in boiling point between these isolated cyclic compound fractions, comprised of mixtures of compounds and having continuously increasing boiling points, were found by analysis and molecular weight determinations to contain saturated aliphatic fluorocarbons having more than four carbon atoms in the molecule.

The distillation residue, which was liquid at room temperature, had a boiling point range of 95° to 160° C. This fraction was found by analysis to contain, by weight, 77% fluorine and (by difference) 23% carbon, corresponding to a fluorine to carbon atomic ratio of 2.1. On account of the large range in boiling point, it was difficult to obtain a reliable value for average molecular weight; a value of 424 was obtained experimentally, but is probably too low. However, this molecular weight definitely indicates fluorocarbons having eight or more carbon atoms in the molecule. This is also indicated by the boiling point range, compared to the values for the lower fluorocarbons obtained. The fact that the experimentally determined F:C atomic ratio is 2.1, indicates the presence of saturated aliphatic (acyclic) fluorocarbons in the mixture in addition to cyclic compounds.

That these fractions consist of saturated fluorocarbon compounds can be easily demonstrated by passing the vapor over $HgF_2$ in a tube heated sufficiently to prevent condensation. If olefinic (or acetylenic) compounds were present in appreciable amount, fluorination would take place to a recognizable degree and the fluorine analysis value, as well as values for physical properties, would be appreciably changed. The evidence shows that the fluorocarbon fractions obtained by the present process do not contain such unsaturated compounds. This accords with the expectation based on the kind of process employed in making the compounds.

The presence in the fraction boiling above 95° C. of small amounts of aromatic or benzenoid fluorocarbon compounds is not excluded, and evidence was found of the presence of such compounds in lower boiling fractions. Evidence on this point is difficult to obtain owing to the complexity of the higher boiling fraction.

*Example 2*

In this work, the reaction vessel was a horizontal iron pipe approximately 48 inches long and 2 inches in diameter, closed at each end except for inlet and outlet connections. It was covered with asbestos paper, and wound with 16 gauge Nichrome wire to provide for electric resistance heating, which in turn was covered with magnesia insulation about one inch thick. A sheet iron tray of the same length, extending across the pipe near the axis, was employed for holding the carbon powder. The fluorine inlet tube extended over one end of the tray. Thermocouples were inserted in the pipe, below the tray, for temperature observation. Operation was continuous except for replacement of carbon. Each charge consisted of 250 grams of finely divided "Norit" carbon containing 5% by weight of thoroughly admixed powdered mercury fluoride ($HgF_2$) as catalyst.

The temperature of the vessel was held between 350° and 385° C. The reaction zone, in which fluorine reacted with carbon, was a relatively narrow region, starting at the fluorine inlet and progressing toward the outlet end of the pipe as the carbon was consumed. The products in vapor state were led through a tube to a copper collecting vessel immersed in a mixture of solid—$CO_2$ and acetone contained in a Dewar flask, where all but the lowest-boiling gaseous compounds were condensed. This condensed liquid mixture was transferred from time to time to a storage vessel and was stabilized at 25° C. to remove low-boiling constituents, and was then fractionated.

The primary distillation fractions boiling within the range of about 100° to 300° C. were combined and refractionated. The refractive index was determined for each cut during the distillation. When these values were plotted on a distillation curve graph, it was seen that the refractive index curve does not parallel the boiling point curve. While the boiling point curve steadily rises (extending from 90° to above 300° C.), although not at a uniform rate and with steps or plateaus interposed between steeper portions (indicating a mixture of compounds of differing structures), the refractive index curve rises and falls although the general trend is upward. The refractive indices of the non-cyclic fluorocarbons are lower than those of the cyclic fluorocarbons adjacent in boiling point, and hence the relation of the refractive index curve to the boiling point curve showed that there was a mixture of non-cyclic and cyclic fluorocarbons with both types extending to high-boiling compounds.

The isolated products with boiling points above about 240° C. were all solid at room temperature, but solid compounds of lower boiling point were also found in the total mixture (which was liquid at room temperature, the solid compounds being dissolved in the liquid compounds).

In order to obtain direct evidence of the presence of compounds representative of each of the three sub-groups previously mentioned, a fractional separation was conducted to isolate from the total mixture boiling above 90° C. a number of relatively pure single compounds, as well as a number of mixture fractions having narrow boiling point ranges, and these were analyzed and various physical properties were measured.

The properties determined were boiling point, freezing point of solid materials, molecular weight, fluorine content by analysis, and liquid density, refractive index, surface tension, viscosity and dielectric constant. Molecular weight was determined by vapor density measurement. Fluorine content was determined by reacting the fluorocarbon fraction with sodium or potassium at high temperature, the alkali fluorides were dissolved in water and the solutions titrated with thorium nitrate using sodium alizarin sulfonate as the indicator.

The table hereinafter presented summarizes the measured properties of isolated compounds and narrow fractions, being limited to fluorocarbon products containing eight or more carbon atoms in the molecule. Isomeric forms (having different structures but the same numbers of carbon and fluorine atoms in the molecule) could not in general be separated from each other owing to the closeness of the boiling points, so that in some cases the stated properties are for a mixture of isomeric forms of the compound specified. It should be understood that the table does not list all of the materials present in the total mixture, but only certain representative compounds and some of the narrow fractions which were isolated.

The table shows a boiling point value for the liquid cyclic $C_8F_{16}$ compound fraction of 97.9–

98.9° C. and for the liquid non-cyclic $C_8F_{18}$ compound fraction of 101.7–102.1° C. This shows that closure of the chain in a ring has but a minor effect on boiling point, although it is lowered. However, other physical properties are substantially affected, as the table shows, and this facilitates identification. $C_8F_{16}$ isomeric fractions boiling as low as about 90° C. were obtained, but the portion boiling at 97.9–98.9° C. was taken as representative for listing in the table.

The table shows that two liquid 9-carbon cyclic compounds were isolated. The $C_9F_{16}$ compound is presumably a bicyclic compound having fused 5-carbon and 6-carbon rings. The monocyclic $C_9F_{18}$ compound is believed to be one having a 6-carbon ring with three attached —$CF_3$ groups. The liquid $C_{10}F_{18}$ fractions presumably contain bicyclic compounds, including a compound formed of fused 6-carbon rings.

The 13-carbon solid compound, identified as $C_{13}F_{22}$, having a freezing point of 81–82° C. and a boiling point of 196.0–198.0° C., presumably consists of three fused 6-carbon rings arranged analogously to the rings of the hydrocarbon benzonaphthene. The high freezing point is explained by the highly symmetrical molecular structure of this compound. The fractions listed before and after this $C_{13}F_{22}$ compound are liquid at room temperature and have determined F:C atomic ratios of 1.8 and 1.5, respectively, indicating the presence of fused ring compounds which are less symmetrical. These fractions contain mixtures of fluorocarbons in the 12 to 13, and 15 to 16, carbon atom ranges, respectively.

The next higher fraction listed in the table is estimated to be in the 16-carbon range and is a solid at room temperature, with a determined F:C atomic ratio of 1.65.

The highest-boiling fraction of the table, also a solid material, has a boiling point range of 280–300° C. The molecular weight indicates 20 to 22 carbon atoms. The determined F:C atomic ratio is 1.6.

Fluorocarbon compounds having boiling points above 300° C. were also obtained but are not listed because of the difficulty of making separations.

TABLE

*Physical Properties of Representative High-boiling Fluorocarbon Fractions*

| | Boiling Point, °C. | Molecular Weight | | Per Cent F | | Liquid Density g./cc. at 20° C. | Refractive Index $n_D^{20}$ | Surface Tension Dynes per cm. 20° C. | Kinematic Viscosity Centistokes | | Dielectric Constant |
|---|---|---|---|---|---|---|---|---|---|---|---|
| | | Exp. | Calc. | Exp. | Calc. | | | | 18° C. | 37.8° C. | |
| $C_8F_{16}$ | 97.9– 98.9 | 404 | 400 | 75.5 | 76.0 | 1.841 | 1.292 | 15.9 | 1.08 | 0.76 | 1.84 |
| $C_8F_{18}$ | 101.7–102.1 | 437 | 438 | 77.1 | 78.1 | 1.802 | 1.282 | 14.9 | 0.73 | 0.55 | |
| $C_9F_{16}$ | 115.5–116.0 | 416 | 412 | 74.4 | 73.8 | 1.884 | 1.3047 | 17.5 | 2.19 | 1.39 | 1.74 |
| $C_9F_{18}$ | 119.1–123.3 | 455 | 450 | 75.8 | 76.0 | 1.865 | 1.294 | 16.7 | 1.42 | 1.07 | 1.76 |
| $C_{10}F_{18}$ (a) | 137.9–139.0 | 466 | 462 | | | 1.908 | 1.3077 | 17.9 | 2.25 | 1.47 | 1.78 |
| $C_{10}F_{18}$ (b) | 139.5–139.9 | 475 | 462 | 75.4 | 74.2 | 1.917 | 1.3088 | 18.3 | | | 1.79 |
| $C_{12-13}$ | 171.0–173.0 | 578 | | 73.6 | | 1.954 | 1.3212 | 19.1 | 4.93 | 2.73 | 1.88 |
| $C_{13}F_{22}$ | 196.0–198.0 | 580 | 574 | 70.7 | 72.8 | | [1] 1.333 | | | | |
| $C_{15-16}$ | 220.0–240.0 | 691 | | 69.8 | | 2.039 | 1.3120 | 21.6 | | 9.85 | 1.85 |
| $C_{16}$ | 240.0–250.0 | 743 | | 72.3 | | | | | | | |
| $C_{20-22}$ | 280.0–300.0 | 850 | | 71.7 | | | | | | | |

[1] Supercooled.

What I claim is as follows:

1. A liquid fluorocarbon mixture boiling within the range of approximately 95° to 160° C., consisting essentially of a mixture of saturated fluorocarbon compounds having at least eight carbon atoms per molecule, the F:C atomic ratio of the liquid exceeding 2.00.

2. A mixture of high-boiling fluorocarbon compounds containing only fluorine and carbon comprising compounds having at least eight carbon atoms per molecule and boiling within the range of 95° to 160° C.

JOSEPH H. SIMONS.

REFERENCES CITED

The following references are of record in the file of this patent:

UNITED STATES PATENTS

| Number | Name | Date |
|---|---|---|
| 2,186,916 | Wiezevich | Jan. 9, 1940 |
| 2,230,654 | Plunkett | Feb. 4, 1941 |
| 2,423,045 | Passino et al. | June 24, 1947 |
| 2,456,027 | Simons | Dec. 14, 1948 |

FOREIGN PATENTS

| Number | Country | Date |
|---|---|---|
| 525,244 | Great Britain | Feb. 20, 1940 |

OTHER REFERENCES

Fukuhara et al.: J. A. C. S.; 63, 2792–2795 (1941).

Ruff et al.: Zeit. Anorg. Allegm. Chem. 192, 250–1 (1930).

Ruff et al.: Ibid. 217, 2, 7, 10, 19–21 (1934).

Lebeau et al.: Compt. Rend., 191, 939–40 (1930).